US011614406B2

(12) United States Patent
Hobbs, Jr. et al.

(10) Patent No.: US 11,614,406 B2
(45) Date of Patent: Mar. 28, 2023

(54) SYSTEMS AND METHODS FOR INSPECTING SOLAR MODULES USING HIGH-POWER LIGHT SOURCES

(71) Applicant: The Southern Company, Atlanta, GA (US)

(72) Inventors: William B. Hobbs, Jr., Hoover, AL (US); Braden H. Gilleland, Rome, GA (US)

(73) Assignee: The Southern Company, Atlanta, GA (US)

( * ) Notice: Subject to any disclaimer, the term of this patent is extended or adjusted under 35 U.S.C. 154(b) by 0 days.

(21) Appl. No.: 16/397,505

(22) Filed: Apr. 29, 2019

(65) Prior Publication Data
US 2019/0331602 A1    Oct. 31, 2019

Related U.S. Application Data

(60) Provisional application No. 62/664,574, filed on Apr. 30, 2018.

(51) Int. Cl.
| | |
|---|---|
| *G01N 21/64* | (2006.01) |
| *G01N 21/88* | (2006.01) |
| *G06T 7/00* | (2017.01) |
| *H02S 50/15* | (2014.01) |
| *G01N 21/63* | (2006.01) |

(52) U.S. Cl.
CPC ......... *G01N 21/6456* (2013.01); *G01N 21/63* (2013.01); *G01N 21/8806* (2013.01); *G01N 21/8851* (2013.01); *G06T 7/0004* (2013.01); *H02S 50/15* (2014.12)

(58) Field of Classification Search
CPC ........... G01N 21/6456; G01N 21/8806; G01N 21/8851; G01N 21/9501; G01N 21/6489; G01N 21/956; G01N 2021/646; G01N 21/63; G06T 7/0004; G06T 2207/10064; G06T 2207/30148; H02S 50/15; Y02E 10/50
See application file for complete search history.

(56) References Cited

U.S. PATENT DOCUMENTS

| | | | | |
|---|---|---|---|---|
| 4,501,966 A | * | 2/1985 | Forman ............... | G01N 21/956 |
| | | | | 250/332 |
| 5,367,174 A | * | 11/1994 | Bazile .................... | H02S 50/10 |
| | | | | 250/559.45 |
| 9,464,991 B2 | * | 10/2016 | Voronov ............ | G01N 21/9501 |
| 9,985,158 B2 | * | 5/2018 | Lunt ..................... | H01L 31/055 |
| 2002/0051579 A1 | * | 5/2002 | Dugue ..................... | G06T 7/97 |
| | | | | 382/228 |

(Continued)

OTHER PUBLICATIONS

Princeton Instruments PIXIS:1024 Manual, 7 pages, which is disclosed by US2016/0218670 A1 (Johnston). (Year: 2016).*

(Continued)

*Primary Examiner* — Kiho Kim
(74) *Attorney, Agent, or Firm* — Troutman Pepper Hamilton Sanders LLP; Dustin B. Weeks

(57) ABSTRACT

Embodiments of the present disclosure are directed to systems and methods for inspecting solar modules, and in particular systems and methods incorporating high-power light sources to impart ultraviolet fluorescence of solar modules. The systems and methods can include a filter and/or a camera.

19 Claims, 3 Drawing Sheets

(56) References Cited

U.S. PATENT DOCUMENTS

| | | | | |
|---|---|---|---|---|
| 2003/0128737 | A1* | 7/2003 | McGrath | G01K 11/3213 374/161 |
| 2009/0051914 | A1* | 2/2009 | Trupke | H01L 22/14 356/302 |
| 2009/0127448 | A1* | 5/2009 | Fuyuki | H02S 50/10 250/238 |
| 2012/0134131 | A1* | 5/2012 | Nakamura | G02B 19/0028 362/2 |
| 2013/0027543 | A1* | 1/2013 | Boeykens | G01R 31/2635 348/92 |
| 2013/0062536 | A1* | 3/2013 | Bardos | G01N 21/6489 250/459.1 |
| 2013/0129187 | A1* | 5/2013 | Maxwell | G06T 7/0004 382/141 |
| 2014/0106062 | A1* | 4/2014 | Forrest | C23C 14/12 427/9 |
| 2014/0212020 | A1* | 7/2014 | Weber | G01N 21/6456 382/145 |
| 2015/0168303 | A1* | 6/2015 | Trupke | G01R 31/2656 324/762.01 |
| 2016/0084764 | A1* | 3/2016 | Trupke | G01N 21/6489 250/206 |
| 2016/0218670 | A1* | 7/2016 | Johnston | G01N 21/63 |
| 2016/0365834 | A1* | 12/2016 | Gastaldo | H02S 40/22 |

OTHER PUBLICATIONS

Schlothauer et al., "Degradation of the encapsulant polymer in outdoor weathered photovoltaic modules: Spatially resolved inspection of EVA ageing by fluorescence and correlation to electroluminescence," 2012, Solar Energy Materials & Solar Cells, vol. 102, pp. 75-85. (Year: 2012).*

Koch et al., "Outdoor electroluminescence imaging of crystalline photovoltaic modules: comparative study between manual ground-level inspections and drone-based aerial surveys", Jun. 2016, 32nd European Photovoltaic Solar Energy Conference and Exhibition, 5 pages. (Year: 2016).*

Bhoopathy et al., "outdoor photoluminescence imaging of photovoltaic modulus with sunlight excitation," 2017, PHTOVOLTAICS, pp. 69-73. (Year: 2017).*

Morlier et al., "Detecting photovotaic module failures in the field during daytime with UV fluorescence module inspection," IEEE Journal of Photovoltaics, vol. 7, No. 6, pp. 1710-1716. (Year: 2017).*

Morlier, A. et al, "UV Fluorescence Imaging as Fast Inspection Method for PV Modules in the Field," International Energy Agency Photovoltaic Power Systems Programme, Apr. 6, 2016, Blozano, Italy.

Austrian Institute of Technology, "UV-Fluorescence Test Equipment & Services," Jun. 2016.

Morlier, A. et al., "Detecting Photovoltaic Module Failures in the Field During Daytime with Ultraviolet Fluorescence Module Inspection," IEEE Journal of Photovoltaics, vol. 7, No. 6, pp. 171016, Nov. 2017.

Morlier, A. et al., "Detecting Cell Cracks and Other PV Module Failures with UV Fluorescence," PV Tech Power, vol. 12, pp. 81-84, Sep. 2012.

Kontges, M. et al., "Cell Cracks Measured by UV Fluorescence in the Field," 27th European Photovoltaic Solar Energy Conference, 2012.

Morlier, A. et al., "Contact-Free Determination of Ethylene Vinyl Acetate Crosslinking in PV Modules with Fluorescence Emission," 4th International Conference on Silicon Photovoltaics, 2014.

Eder, G et al., "Fluorescence Spectroscopy and Imaging on Aged Polymeric PV-Encapsulantes," European Symposium of Polymer Spectroscopy, Dresden, Germany, Sep. 20, 2016.

* cited by examiner

SYSTEMS AND METHODS FOR INSPECTING SOLAR MODULES USING HIGH-POWER LIGHT SOURCES

CROSS-REFERENCE TO RELATED APPLICATIONS

This application claims the benefit, under 35 U.S.C. § 119(e), of U.S. Provisional Patent Application No. 62/664,574, filed 30 Apr. 2018, the entire contents and substance of which is incorporated herein by reference in its entirety as if fully set forth below.

TECHNICAL FIELD

The present disclosure is directed to systems and methods for inspecting solar modules, and in particular, systems and methods incorporating high-power light sources to impart ultraviolet fluorescence of solar modules.

BACKGROUND

Over time, photovoltaic or solar modules can develop cracks that are not visible from the outside without special equipment. These cracks can widen over time and negatively affect the lifecycle and effectiveness of the solar panels. Therefore, solar modules can be inspected regularly for defects. Established solar panel inspection techniques can be used to detect defects using electroluminescence. Electroluminescence typically requires directly connecting a power supply to the photovoltaic or solar cell and running a current through the cell. Using a specialized external detector, high resolution images of entire modules can then be taken and reviewed for defects. Because electroluminescence causes light output increase around local voltage, cracks can be observed as dark areas in the image. While this technique is effective, it is relatively tedious because it requires expensive equipment and disconnecting the solar panel from other devices, among other safety concerns.

Known approaches to ultraviolet (UV) fluorescence use low-power light sources such as a black light. Such approaches are deficient because they require longer exposure, additional equipment (e.g., a tripod to help account for the longer exposure), and can only be performed at night or in another environment eliminating exposure to external UV light sources (e.g., sunlight).

Accordingly, there is a need for improved systems and methods for inspection of solar modules. Embodiments of the present disclosure are directed to this and other considerations.

SUMMARY

Embodiments of the presently disclosed technology can comprise a system for inspecting solar modules. In some embodiments, a system for inspecting solar modules can comprise a lighting device comprising a high-power light source configured to emit high-power light energy for an exposure time and an output region configured to direct the light energy towards a solar module. When the solar module is exposed to the high-power light energy from the light device, at least a portion of the solar module can fluoresce. The system for inspecting solar modules can further comprise a filter, the filter being a UV-pass filter configured to pass UV light energy having a predetermined wavelength. In some embodiments, the UV-pass filter can be configured to pass UV light and filter or block light having other wavelengths, such as visible light. The filter can be disposed proximate the lighting device and cover the output region. In some embodiments, the system for inspecting solar modules can comprise an imaging device in communication with the lighting device. The imaging device can include a shutter configured to open at a shutter speed. In some embodiments, the lighting device can communicate with the imaging device so as to synchronize the exposure time of the lighting device with the shutter speed of the imaging device such that when the solar cell module is exposed to the light energy, the imaging device can capture an image of the fluorescence of the solar cell module.

Embodiments of the presently disclosed technology can comprise a method for inspecting solar modules. In some embodiments, a method for inspecting solar modules can comprise coupling a lighting device to an imaging device, the coupling causing an exposure time of the lighting device to be synchronized with a shutter speed of the imaging device; activating the lighting device to emit high-power light energy towards a solar module; filtering the light energy so as to pass UV light energy having a predetermined wavelength; and imaging, as the solar module is exposed to the high-power light energy to acquire a UV fluorescence image of the solar module.

BRIEF DESCRIPTION OF THE DRAWINGS

Reference will now be made to the accompanying figures, which are not necessarily drawn to scale, and wherein.

DETAILED DESCRIPTION

Figure 1:
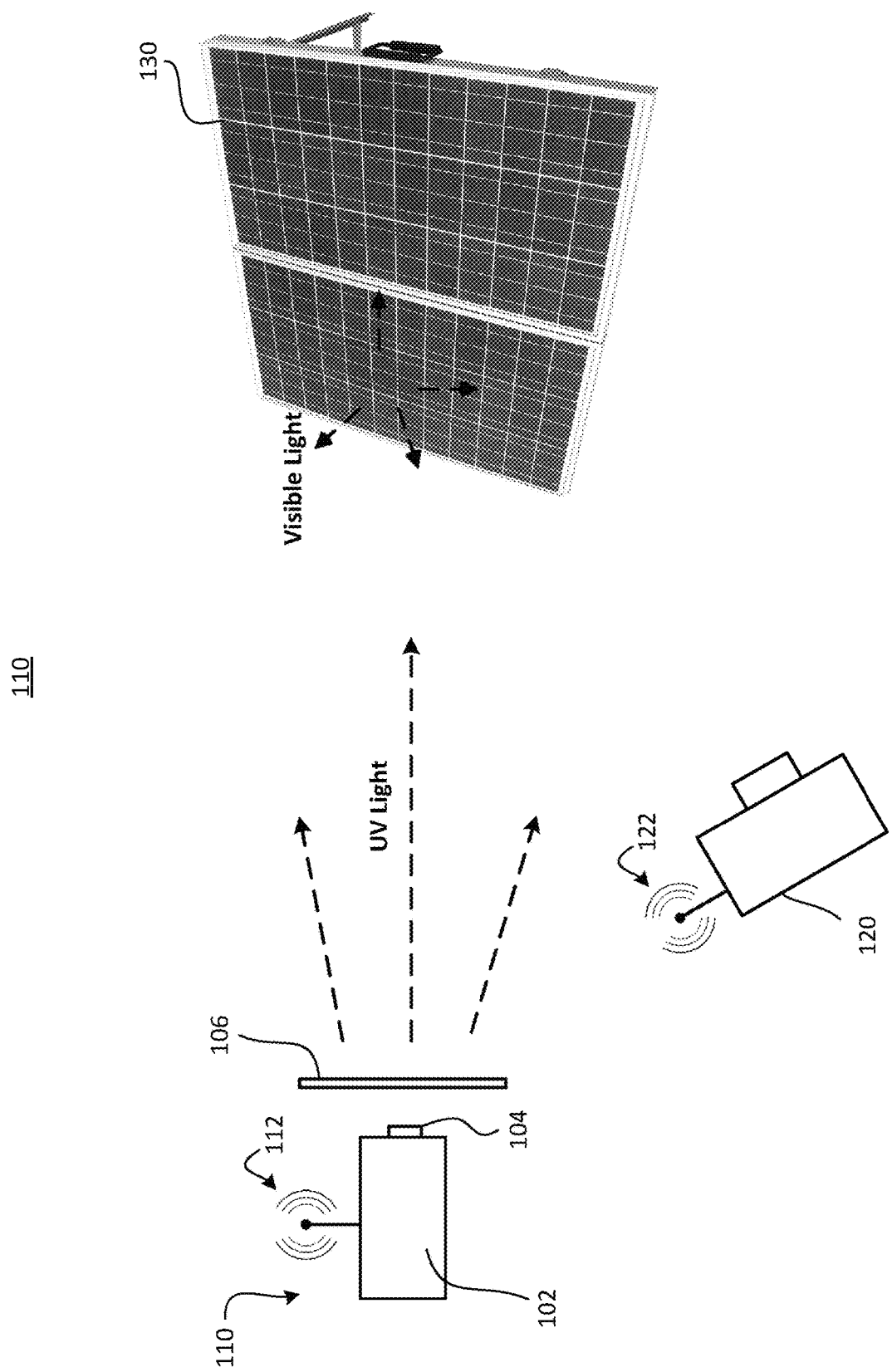
FIG. 1 depicts a system diagram showing a system for inspecting solar modules incorporating a high-power light source to impart ultraviolet fluorescence, according to an example embodiment of the present disclosure.

The disclosed technology can be understood more readily by reference to the following detailed description of exemplary embodiments and the examples included herein. Before the example embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology can, however, be embodied in many different forms and should not be construed as limited to the embodiments set forth therein.

In the following description, numerous specific details are set forth. However, it is to be understood that embodiments of the disclosed technology can be practiced without these specific details. In other instances, well-known methods, structures, and techniques have not been shown in detail in order not to obscure an understanding of this description.

References to "one embodiment," "an embodiment," "example embodiment," "some embodiments," "certain embodiments," "various embodiments," etc., indicate that the embodiment(s) of the disclosed technology so described can include a particular feature, structure, or characteristic, but not every embodiment necessarily includes the particular feature, structure, or characteristic. Further, repeated use of the phrase "in one embodiment" does not necessarily refer to the same embodiment, although it can.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the exemplary embodiments. Such other materials not described herein can include, but are not limited to, materials that are developed after the time of the development of the technology, for example.

UV fluorescence imaging allows for an alternative means for inspecting solar cell modules for defects. Solar cell modules generally are composed of a glass layer, a front-side encapsulant layer (e.g., ethylene-vinyl acetate (EVA)) which acts as an adhesive, the photovoltaic cells, a back-side layer of encapsulant, and a backsheet layer. When cracks occur in the solar cell module, small amounts of oxygen and water vapor can travel through the cracks to the front-side encapsulant layer causing slight chemical changes in the encapsulant layer that can show up visibly over time as brown areas. As the encapsulant layer is exposed to oxygen, the fluorescence around the crack changes or is reduced.

Embodiments of the disclosed technology can be advantageous because they allow for better coverage of imaging (e.g., imaging a larger area of interest of a solar module at a time), allow for quick exposure, allow for imaging both during the day and at night, and do not require additional equipment or to disconnect the solar panel.

FIG. 1 illustrates an example system for inspecting solar modules 100. As shown in FIG. 1, in some embodiments, the system 100 can comprise a lighting device 110, an imaging device 120, and a solar module 130. The lighting device 110 can be activated to emit high-power light energy which can be filtered (e.g., using the filter 104) to expose the solar module 130 primarily to UV light energy. Exposing the solar module 130 to UV light energy can cause portions of the solar module 130 (e.g., encapsulant layer) to fluoresce. In some embodiments, the imaging device 120 can operate in a synchronized manner with the lighting device 110 so as to capture an image of the solar module 130 as the solar module 130 fluoresces. In some embodiments, the system for inspecting solar modules 100 can be used for inspection of solar modules for cracks or other conditions which cannot be readily apparent in the visible spectrum. When exposed to UV light energy, damaged portions of the solar module 130 can exhibit a fluorescence that is different from fluorescence of non-damaged portions of the solar module 130. Indeed, in many instances such defects can be identified as portions of the solar module 130 that do not fluoresce.

In some embodiments, as illustrated at FIG. 1, the lighting device 110 can comprise a high-power light source 102 and an output region 104. The high-power light source 102 can be arranged so as to emit UV light towards the solar module 130. As used herein, "high-power" can refer to light sources that are rated to receive power from a power source of at least approximately 50 watt-seconds in approximately $1/200$ seconds. In other words, "high-power" light sources can be light sources that receive at least approximately 10,000 Watts in total input power. This is in contrast to typical "low-power" UV light sources, which are typically rated at 3-10 Watts per diode element. As used herein, "high-power" can also refer to a light source powerful enough to cause fluorescence that can be imaged by an imaging device (e.g., imaging device 120, discussed below) configured to have a shutter speed of approximately $1/100^{th}$ of a second (approximately 0.01 seconds) or less.

In some embodiments, the high-power light source 102 can be a high-power broad-spectrum light source (e.g., an uncoated xenon flash tube, high-power fluorescent tube, metal halide lamp). For instance, in some embodiments, the high-power broad-spectrum light source can be a flash for a conventional camera. Many such conventional camera flashes, however, include a UV spectrum filter which removes the UV components of the emitted light. Accordingly, in some embodiments of the present invention, the UV filter can be removed to allow the UV spectrum of light to be transmitted to the solar modules 130.

The high-power light source 102 can be configured to expose the solar module 130 for an exposure time or flash duration. An advantage of incorporating the high-power light source 102 is the exposure time can be decreased. In some embodiments, the exposure time can be from approximately $1/1000$ seconds to approximately $1/200$ seconds for images acquired at night time. In some embodiments, the exposure time can be approximately $1/1000$ seconds, approximately $1/800$ seconds, approximately $1/750$ seconds, approximately $1/500$ seconds, approximately $1/400$ seconds, approximately $1/300$ seconds, approximately $1/250$ seconds, or approximately $1/200$ seconds. In some embodiments, the exposure time can be at least approximately $1/1000$ seconds, at least approximately $1/800$ seconds, at least approximately $1/750$ seconds, at least approximately $1/500$ seconds, at least approximately $1/400$ seconds, at least approximately $1/300$ seconds, or at least approximately $1/250$ seconds. It is to be understood that the exposure time can be increased or decreased, as desired. For instance, the exposure time can be decreased if the images are taken during the day.

In some embodiments, the lighting device 110 can comprise one or more additional optical elements, including but not limited to dispersers, separators, filters, beam splitters, or lenses.

In some embodiments, a filter 106 can be disposed in front of the lighting device 110 so as to cover the output region 104. In some embodiments, the filter 106 can be a visible light filter configured to block visible light but pass UV light. For instance, in some embodiments, the filter 106 can be a UV pass filter which can filter out or block most of the incident light at wavelengths outside the ultraviolet range. In some embodiments, the UV pass filter can pass UV light in a specific wavelength range. For instance, the UV pass filter can pass UV light having a wavelength between approximately 300 nm to approximately 400 nm. In other embodiments, the UV pass filter can pass UV light having a wavelength between approximately 100 to approximately 400 nm, approximately 150 nm to approximately 400 nm, approximately 200 nm to approximately 400 nm, approximately 250 nm to approximately 400 nm, approximately 300 nm to approximately 400 nm, approximately 350 nm to approximately 400 nm. In other embodiments, the UV pass filter can pass UV A radiation (approximately 320 nm to approximately 385 nm).

As will be appreciated, the color of fluorescence for a particular make and/or model of solar module 130 can vary based on, for example, the materials used in the solar module 130. For example, many existing solar modules 130 are known to fluoresce blue, green, or a combination thereof. As another example, some existing solar modules 130 are known to fluoresce orange, green, or a combination thereof. Thus, some embodiments can include a filter 106 that is not strictly a UV pass filter but also allows a predetermined amount of light from the visible spectrum to pass, where the passed visible light has a wavelength (or wavelength range) that does not overlap with the wavelength (or wavelength range) of the visible light associated with the fluoresce color of the subject solar module 130. Stated otherwise, the filter 106 can be configured to pass UV light and block at least the portion of visible light that is the same or similar color to fluoresce color of interest for a given solar module 130. For example, if the subject solar module 130 is known to fluoresce blue, green, or a combination thereof, the system 100 can still effectively function if the filter 106 passes visible red light in addition to UV light. By not requiring a strict UV pass filter, it may be possible for the system 100 to effectively function while using a filter 106 that is a readily available, inexpensive, "off-the-shelf" filter.

In some embodiments, the filter 106 can be positioned in front of the lighting device 110. In other embodiments, the filter 106 can be mounted to the lighting device 110. In either instance, the filter assembly—which is an assembly housing the filter 106—can fully conceal the output region 104.

The filter 106 can be any suitable shape including but not limited to circular, square-shaped, rectangular, oval, or triangular. The filter assembly can be any suitable size for effectively concealing the output region 104. For example, in some embodiments, the filter 106 can be between 3 cm to 8 cm wide, between 4 cm to 7 cm wide, between 3 cm to 6 cm wide, or 5 cm wide. The filter 106 can be any suitable thickness. For example, the filter 106 can be 1 mm to 5 mm thick, 2 mm thick, 3 mm thick, or 4 mm thick.

The solar module 130 can comprise any solar panel or solar cell technology known in the art. As will be understood by those of skill in the art, the solar module 130 can include a transparent substrate (typically composed of tempered glass), a front-side encapsulant layer (typically composed of ethylene vinyl acetate), a plurality of conductive cells, a back-side encapsulant layer, and a backsheet layer.

When exposed to UV light from the lighting device 110, the solar module 130 can fluoresce. In some embodiments, the solar module 130 can have one or more fluorescing regions and one or more non-fluorescing regions. The one or more fluorescing regions can produce visible light that can be captured by an imaging device sensitive to visible light. The one or more non-fluorescing regions can be bleached out (i.e., not produce visible light) and indicate one or more corresponding regions that contain a defect.

In some embodiments, an imaging device 120 can be used to capture an image of the solar module 130 as it fluoresces due to exposure to UV light from the lighting device 110. The imaging device 120 can include any imaging device that is sensitive to visible light but not UV light. For instance, in some embodiments, the imaging device 120 can be a camera. In some embodiments, the imaging device 120 can be a consumer-available digital camera.

In some embodiments, the lighting device 110 can be in communication with the imaging device 120 to allow for synchronization between exposure from the lighting device 110 at its highest intensity and the shutter of the imaging device 120. In some embodiments, each of the lighting device 110 and the imaging device 120 can comprise a communication interface 112, 122 for providing communication between the lighting device 110 and the imaging device 120. Communication between the high-power light source 102 via the communication interface 112, 122 can be achieved using any means known in the art, including, but not limited to, wired connections or wireless connections. Non-limiting examples of communication methods include radio communication (e.g., analog, digital), near-field communication (NFC), Bluetooth™ Bluetooth™ low-energy (BLE), WiFi™, ZigBee™, ambient backscatter communications (ABC) protocols, USB, or LAN.

In some embodiments, the imaging device 120 can be defined by a shutter speed. The shutter speed can correspond to the length of time when a film or digital sensor in the imaging device 120 is exposed to light. In some embodiments, the shutter speed of the imaging device 120 can be set to be less than or equal to the exposure time of the lighting device 110. In some embodiments, the shutter speed of the imaging device 120 can be approximately equal to the duration of exposure when the high-power light source 102 is at its highest intensity.

In some embodiments, the shutter speeds and exposure time can last anywhere between approximately $\frac{1}{8000}$ and approximately 1 second. In some embodiments, the shutter speeds and exposure time can last anywhere between approximately $\frac{1}{8000}$ and approximately $\frac{1}{100}$ seconds. In some embodiments, the shutter speeds and the highest power portions of the UV light source output can last for approximately $\frac{1}{250}$ seconds, approximately $\frac{1}{300}$ seconds, approximately $\frac{1}{400}$ seconds, approximately $\frac{1}{450}$ seconds, approximately $\frac{1}{500}$ seconds, approximately $\frac{1}{600}$ seconds, approximately $\frac{1}{700}$ seconds, approximately $\frac{1}{800}$ seconds, approximately $\frac{1}{900}$ seconds, approximately $\frac{1}{1000}$ seconds, approximately $\frac{1}{1250}$ seconds, approximately $\frac{1}{1500}$ seconds, approximately $\frac{1}{1750}$ seconds, approximately $\frac{1}{2000}$ seconds, approximately $\frac{1}{3000}$ seconds, approximately $\frac{1}{4000}$ seconds, approximately $\frac{1}{5000}$ seconds, approximately $\frac{1}{6000}$ seconds, approximately $\frac{1}{7000}$ seconds, or approximately $\frac{1}{8000}$ seconds. In some embodiments, where inspection occurs during the day, the exposure time can be shorter. The exposure time can be longer (e.g., approximately ½ second, approximately 1 second), provided the flash is a short duration, such as less than approximately $\frac{1}{100}$ seconds.

In some embodiments, the lighting device 110 can be positioned and oriented so as to direct the high-power light source 102 and its corresponding light energy emission towards the solar module 130. In some embodiments, the light source 102 can be positioned in line with the solar module 130. In some embodiments, the light source 102 can be disposed above the solar module 130 so as to emit light on the solar module 130. In some embodiments, the light source 102 can be oriented at an angle with respect to the solar module 130. Those skilled in the art would understand that the position and orientation of the high-power light source 102 can be adjusted as desired based on the position and orientation of the solar module 130.

In some embodiments, the imaging device 120 can be positioned so as to capture fluorescence of the solar module 130 but not interfere with light exposure by the lighting device 110. In some embodiments, the lighting device 110 can be positioned as close as possible to the solar module 130 while still illuminating an area of interest, and the imaging device 120 can be positioned so as to capture the full area of interest. In some embodiments, the imaging device 120 can be positioned in line with the solar module 130. In some embodiments, the imaging device 120 can be disposed above the solar module 130. For instance, in some embodiments, the imaging device 120 can be aircraft-based (e.g., on a drone). The aircraft can be any aircraft now known or later discovered and can include manned and/or unmanned aircrafts. In some embodiments, the imaging device 120 can be oriented at an angle with respect to the solar module 130. Those skilled in the art would understand that the position and orientation of the imaging device 120 can be adjusted as desired based on the position and orientation of the solar module 130 and the position and orientation of the lighting device 110.

As will be appreciated, extended or repeated use of the high-power light source 102 can damage the filter 106. To reduce the likelihood of damage to the filter 106, the filter 106 can be included in a filter assembly, and the filter assembly can include one or more openings or apertures between the high-power light source 102 and the filter 106 to permit ventilation of the area adjacent to the filter 106. The cooling effect provided by the apertures can extend the useful life of the filter 106. Alternately or in addition, the filter assembly can include a fluid-cooling system, such as one or more tubes having a stream of fluid (e.g., water or a coolant) that is pumped through the tubing to remove heat from the filter 106. Alternately or in addition, the filter assembly can include any other cooling system, such as a cooling system including a fan for forced-air convective cooling.

In some embodiments, inspection of solar modules using any of the above-described systems and methods can comprise additional image processing of the acquired image using known image processing techniques including, but not limited to, perspective correction, blurring, lens distortion correction, noise reduction filters, contrast and level adjustment, and binary thresholding.

In some embodiments, inspection of solar modules using any of the above-described systems and methods can occur during the day or night. When images are taken during the day, additional light from the sun can make imaging of fluorescence due to lighting device 110 more difficult. Therefore, in some embodiments, a first image can be taken of the solar module 130 using the lighting device 110 and a second image can be taken of the solar module 130 without the lighting device 110. In some embodiments, the first and second images can be taken within a fraction of a second. In other embodiments, the first and second images can be taken within a few seconds or minutes with stable light (e.g., no environmental changes, such as passing clouds). Using image processing, any light from the sun can be canceled so as to improve the quality of the first image. For instance, pixel values of the second, non-illuminated image can be subtracted from corresponding pixel values of the first, illuminated image to determine combined pixel values, and at least some of the combine pixel values can be combined or arranged to generate a combine image displaying fluorescent and/or non-fluorescent areas of the solar module.

Embodiments of the presently disclosed technology can comprise a method for inspecting solar modules. In some embodiments, a method for inspecting solar modules can comprise coupling a lighting device 110 to an imaging device 120, the coupling causing an exposure time of the lighting device to be synchronized with a shutter speed of the imaging device. In some embodiments, coupling the lighting device to the imaging device can be achieved by linking the lighting device 110 to the imaging device 120 via a wireless connection. In some embodiments, a method for solar module inspection can comprise activating the lighting device 110 to emit light energy towards a solar module 130. In some embodiments, lighting device 110 can comprise a high-power light source. In some embodiments, a method for solar module inspection can comprise filtering the light energy so as to pass UV light energy having a predetermined wavelength (or predetermined wavelength range) and imaging, as solar module 130 is exposed to the light energy, to acquire a UV fluorescence image of the solar module. In some embodiments, a method for solar module inspection can further comprise image processing the UV fluorescence image to reveal a defected region wherein the defected region is characterized by a lack of fluorescence.

Figure 2:
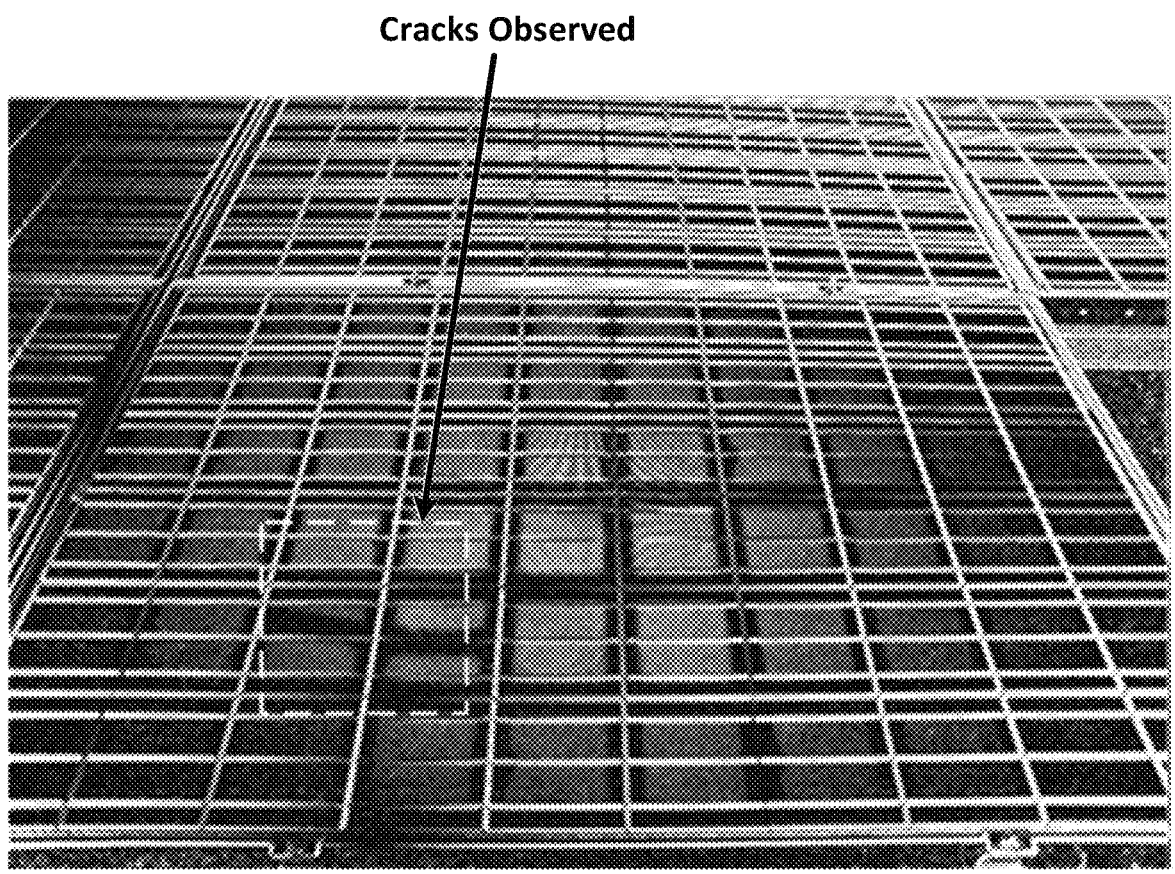
FIG. 2 depicts an image obtained using an example of the herein-described systems and methods and taken in daylight.
Figure 3A:
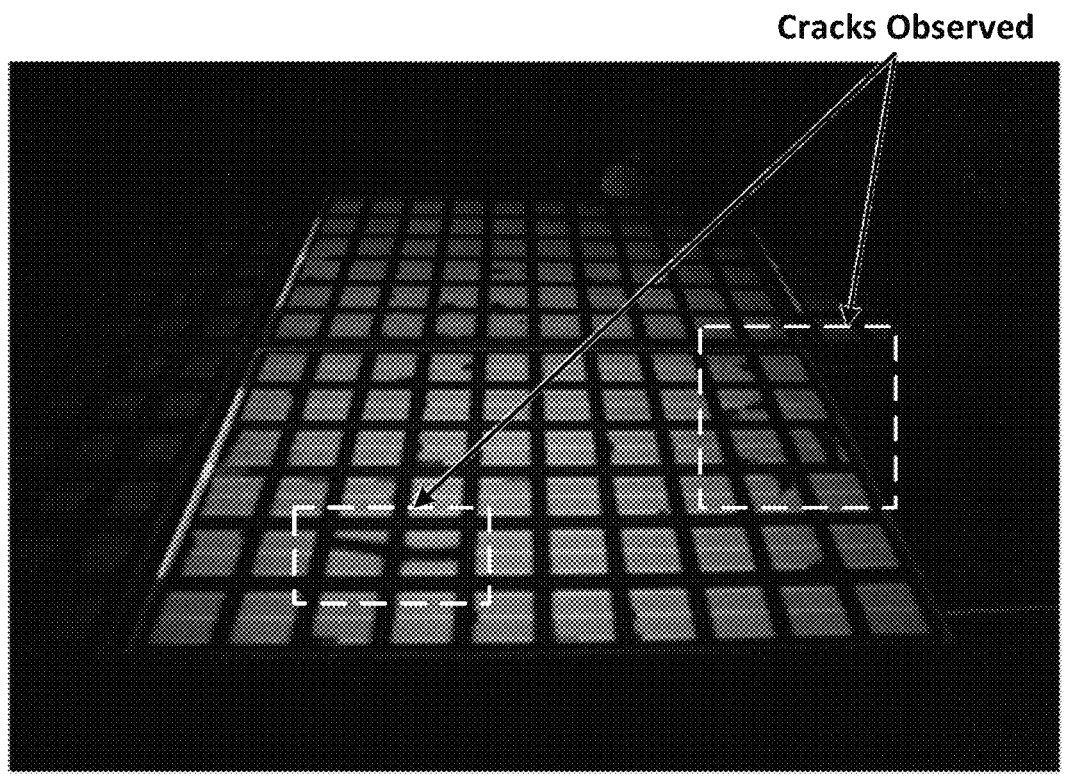
FIG. 3A depicts an image obtained using an example of the herein-described systems and methods and taken at night.
Figure 3B:
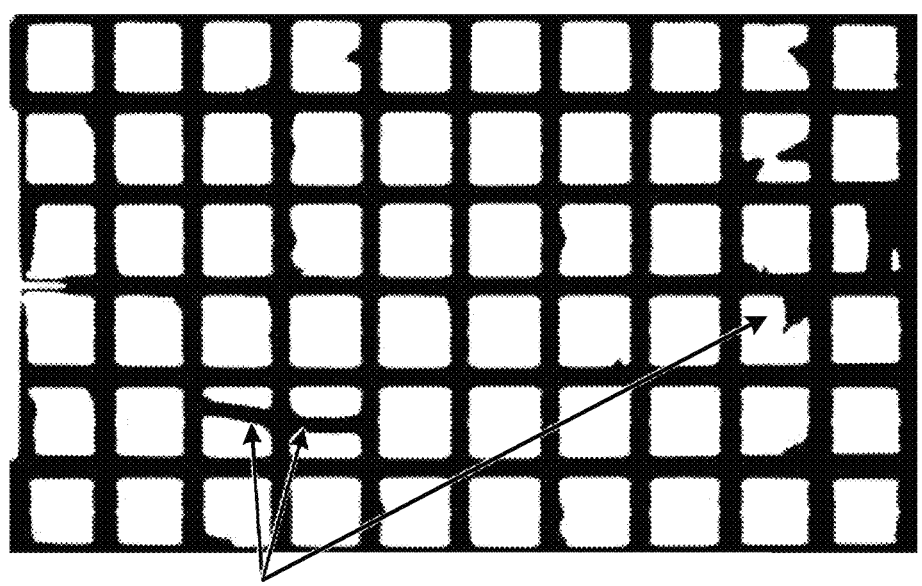
FIG. 3B an image obtained using an example of the herein-described systems and methods with perspective correction, blurring, and a binary threshold.

FIGS. 2, 3A, and 3B show images taken using examples of the herein-described systems and methods. For the example system setup, a Vivitar 283 flash was used with the UV-blocking lens removed. The flash was used in conjunction with a UV-pass filter (B+W 72 mm #403 UV-pass filter). The filter was adhered to the front of the flash to block visible light and allow UV light to pass. An un-modified consumer camera shooting at ISO-12800 and f/2.8, 1/160 s exposure was used to acquire images. Image processing was used to improve the quality of the images using perspective correction, blurring, and binary threshold.

FIG. 2 shows an image obtained using the above-described example system and taken in daylight. More specifically, a first image was obtained using the lighting device incorporating the high-power light source during the day and a second image was obtained without the lighting device. Image processing was performed to improve the quality of the first image, resulting in the image shown in FIG. 2.

FIGS. 3A and 3B show images obtained using the herein described systems and methods and taken at night. FIG. 3B shows an image-corrected version of FIG. 3A using perspective correction, blurring, and a binary threshold.

It will also be appreciated that while certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims here appended and to be filed in non-provisional applications, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A photovoltaic (PV) module inspection system for providing broad area imaging of PV module, the PV module inspection system comprising:
   a lighting device comprising a high-power broad-spectrum light source configured to emit high-power broad-spectrum light incident on a targeted broad area portion of a PV module exposed to natural light to cause an encapsulant layer of at least some of the targeted broad area portion of the PV module to fluoresce;
   a filter disposed between the lighting device and the PV module, the filter being configured to pass a predetermined range of ultra-violet (UV) wavelengths of light and block at least some non-UV wavelengths of light, wherein the filter is further configured to block a range of wavelengths of light corresponding to a color that is blue, green, or a combination thereof and pass a range of wavelengths of light corresponding to a color that is red; and
   an imaging device sensitive to visible light, the imaging device being synchronized with the lighting device and configured to capture an image of at least some of the targeted broad area portion of the PV module when the PV module is exposed to the natural light and the lighting device emits the high-power broad-spectrum light,
   wherein at least some differences in a fluorescent effect of the encapsulant layer is indicative of a crack in a solar cell of the PV module.

2. The PV module inspection system of claim 1, wherein the high-power broad-spectrum light source is configured to receive at least approximately 10,000 Watts in total input power.

3. The PV module inspection system of claim 1, wherein the high-power broad-spectrum light source is a high-power broad-spectrum light source.

4. The PV module inspection system of claim 1, wherein the high-power broad-spectrum light source is configured to emit the high-power broad-spectrum light for an exposure time in a range from approximately 1/1000 seconds to approximately 1/200 seconds.

5. The PV module inspection system of claim 4, wherein the imaging device has a shutter speed that is less than or equal to the exposure time of the high-power broad-spectrum light source.

6. The PV module inspection system of claim 1, wherein the imaging device has a shutter speed of approximately 0.01 seconds or less.

7. The PV module inspection system of claim 1, wherein the filter is further configured to pass a range of wavelengths of light corresponding to a color different from a fluoresce color of the PV module.

8. The PV module inspection system of claim 1, wherein the lighting device comprises a first communication interface and the imaging device comprises a second communication interface, the first and second communication interfaces being in communication such that operation of the lighting device and imaging device is synchronized.

9. The PV module inspection system of claim 8, wherein operation of the lighting device and imaging device is synchronized such that a shutter of the imaging device coincides with a highest output intensity of an emission of high-power broad-spectrum light from the lighting device.

10. The PV module inspection system of claim 1, wherein the filter is disposed within a filter assembly comprising at least one ventilation aperture.

11. The PV module inspection system of claim 1, wherein the imaging device is disposed on an aircraft.

12. The PV module inspection system of claim 1, wherein the range of passed wavelengths of light comprises visible light energy having a red color.

13. The PV module inspection system of claim 1, wherein the natural light can be associated with any time of day such that the PV module inspection system is configured to provide broad-area imaging of the PV module irrespective of a current time of day.

14. A method for inspecting a photovoltaic (PV) module via broad area imaging of the PV module, the method comprising:
   activating a high-power broad-spectrum light source of a lighting device to emit high-power broad-spectrum light energy towards a targeted broad area portion of a PV module exposed to natural light, the high-power broad-spectrum light energy causing an encapsulant layer of at least some of the targeted broad area portion of the PV module to generate a fluorescent effect comprising fluorescent light, at least some differences in the fluorescent effect being indicative of a crack in a solar cell of the PV module;
   filtering the high-power broad-spectrum light energy to pass ultraviolet (UV) light and a range of wavelengths of light corresponding to a color that is red toward the targeted broad area portion of the PV module and block a range of wavelengths of non-UV light in the high-power broad-spectrum light energy corresponding to a color that is blue, green, or a combination thereof; and
   capturing, via a visible light imaging device, an image of at least some of the targeted broad area portion of the PV module when the PV module is exposed to the natural light and the lighting device emits the high-power broad-spectrum light energy and the at least some of the targeted broad area portion of the PV module fluoresces, the visible light imaging device being coupled to the lighting device such that an exposure time of the lighting device is synchronized with a shutter speed of the visible light imaging device.

15. The method of claim 14, wherein filtering the high-power broad-spectrum light energy comprises passing a portion of visible light energy having a color that is different from a predetermined fluoresce color of the fluorescent light of the fluorescent effect.

16. The method of claim 14, wherein capturing the image of the PV module comprises acquiring a UV fluorescence image of the PV module.

17. The method of claim 16 further comprising:
   capturing a visible spectrum image of the PV module when the lighting device is not emitting high-power broad-spectrum light energy towards the PV module; and
   generating a combined image by:

subtracting pixel values of the visible spectrum image from corresponding pixel values of the UV fluorescence image to determine combined pixel values; and arranging at least some of the combined pixel values to form the combined image indicating whether one or more portions of the PV module fluoresced.

18. The method of claim 17, wherein capturing the UV fluorescence image and the visible spectrum image occurs in less than one second.

19. The method of claim 14, wherein the method is performed in sunlight.

* * * * *